March 7, 1950     G. A. LYON     2,499,397
METHOD OF AND APPARATUS FOR FORMING
THIN ANNULAR PLASTIC ARTICLES
Filed July 7, 1945     2 Sheets-Sheet 1
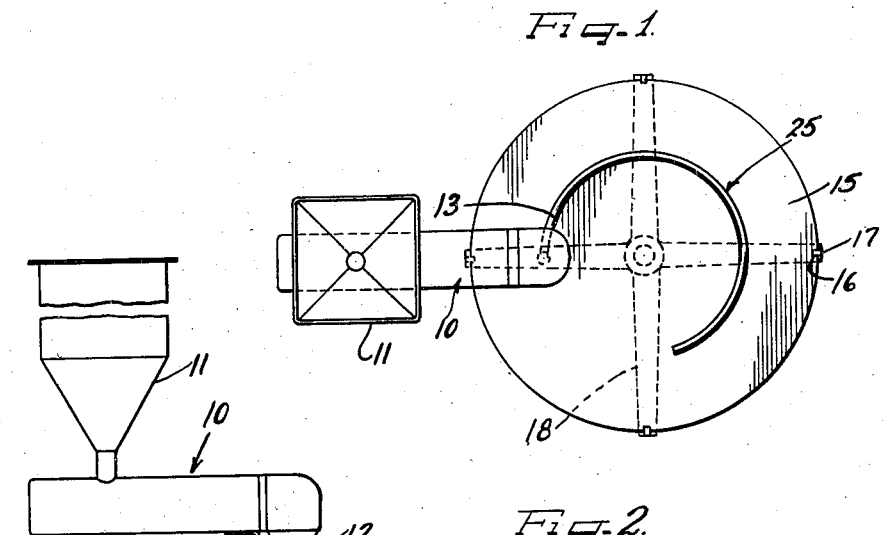
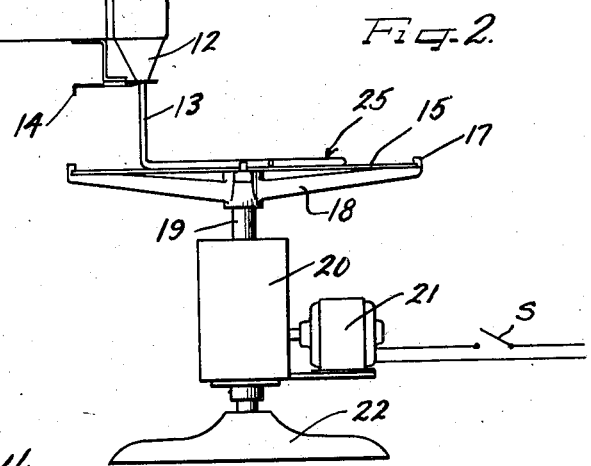
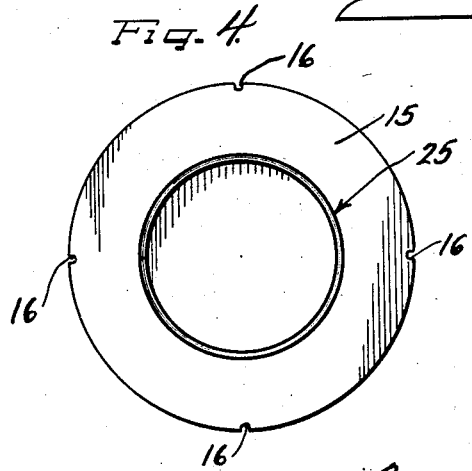
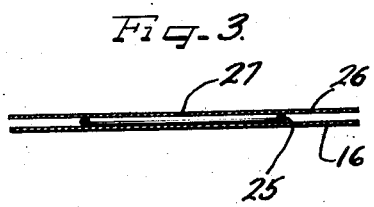
Inventor
GEORGE ALBERT LYON

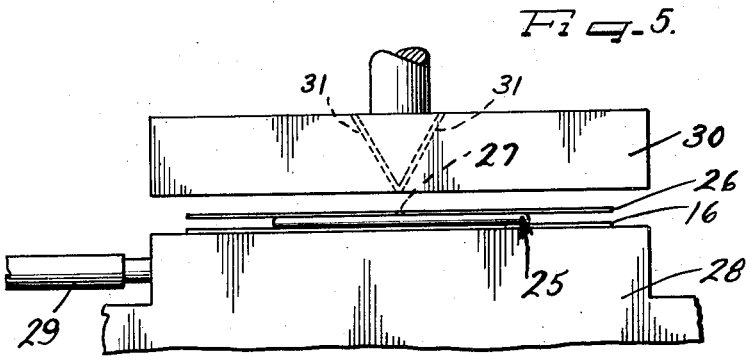
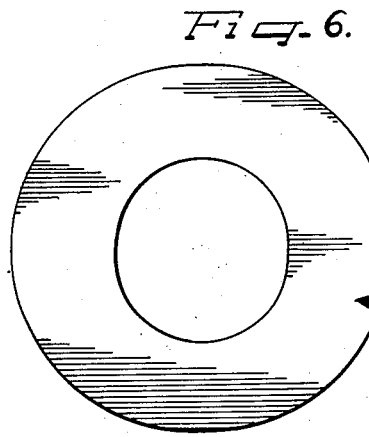
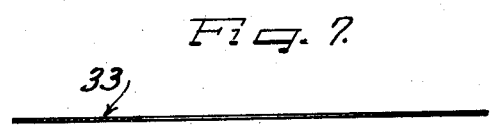
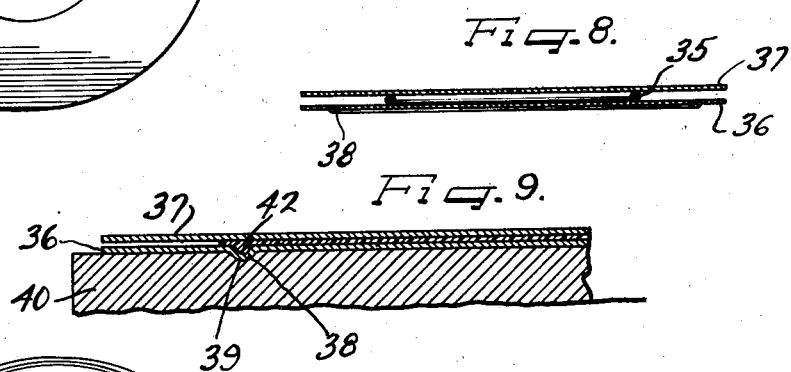
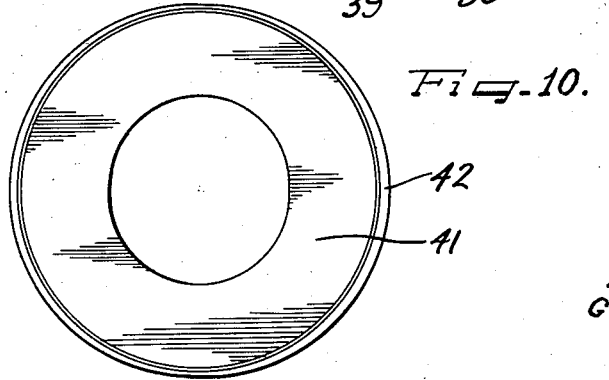

Patented Mar. 7, 1950

2,499,397

UNITED STATES PATENT OFFICE 2,499,397

METHOD OF AND APPARATUS FOR FORMING THIN ANNULAR PLASTIC ARTICLES

George Albert Lyon, Allenhurst, N. J.

Application July 7, 1945, Serial No. 603,662

9 Claims. (Cl. 18—5)

This invention relates to the manufacture of plastic articles and more particularly to a method of and apparatus for forming flat sheet-like plastic articles, such for example, as automobile wheel trim.

The present application is a continuation-in-part of my applications, Serial No. 543,525, filed July 5, 1944, now Patent No. 2,447,415 and Serial No. 599,532, filed June 15, 1945.

Heretofore in the plastic industry, it has been customary to manufacture plastic sheeting by a number of processes of which the most commonly used are the calendering and casting processes.

The calendering method of making plastic sheeting involves pressing the plastic between polished rolls and stripping the sheeting from the rolls. This method or process, however, has not been employed where plastic sheeting having highly polished surfaces is desired. The reason for this is the tacky nature of the material and its tendency to stick to the rolls as the plastic is stripped therefrom.

Hence, when polished plastic sheeting was desired, the industry usually resorted to the casting method or process. In this process, a liquid plastic in solution is allowed to flow over a smooth surface, such for example as a polished plate or a polished drum, and thereafter is permitted to solidify on the supporting surface. Such a process has been extensively used in the casting of film-like sheets of plastic. However, I find that this process, by reason of the time factor involved in the solidifying of the plastic is so expensive as to make its use prohibitive where plastic articles have to be manufactured from sheeting at prices at least comparable to those existing in the fabrication of similar articles from metal sheeting.

It is an aim of this invention to provide a new method of manufacturing synthetic plastic sheeting whereby highly polished sheeting may be produced at a much more economical cost than is true in the use of the casting process.

Yet another object of the invention is to provide a method of manufacturing plastic sheet and articles made therefrom which will enable the fabrication of the articles on a cost basis approximating or less than the cost of making similar articles out of metal sheeting.

A still further object of the invention is to provide a method of and apparatus for making plastic sheeting or articles therefrom wherein the plastic is substantially free of air voids and wherein atmospheric pressure may be utilized to hold the pressed plastic sheeting until it has sufficient time to take a set.

Yet another object of this invention relates to the provision of a method of and apparatus for directly forming extruded plastic rod stock into a desired configuration, such for example, as a closed ring, and wherein the plastic, while it is still hot, may be uniformly squeezed into sheet-like form and provided with highly polished opposite surfaces.

Yet another object of the invention is to provide a method of and apparatus for manufacturing plastic sheeting from hot rod-like plastic stock wherein the steps employed in making the sheeting will result in the substantial elimination of air pockets or voids in the plastic.

A further object of the invention relates to the provision of a method of and apparatus for manufacturing plastic articles, such as circular wheel trim and wherein, during the fabrication of the article, any desired reinforcements may be provided in the article, such for example, as ribs or the like.

In accordance with the general features of this invention, there is provided a method of forming relatively thin flattened plastic with one or more polished surfaces, including the steps of delivering hot continuous strip plastic stock onto a flat plate, cutting off the delivered end of the stock to complete a given configuration of plastic on the plate, applying a hot plate to the top of the cut-off stock, and pressing the plates together to flatten the stock therebetween while still hot.

Yet another feature of the invention relates, in the aforesaid method, to the utilization of atmospheric pressure to force the plates toward each other and to hold the flattened plastic against expansion until it is chilled and stripped from the plate.

A further feature of the invention relates to the forming of at least one of the plates out of flexible thin sheet metal so that the same may be readily flexed to strip it from the flattened sheet plastic and whereby the plastic may thereafter be readily peeled from the other plate.

In accordance with other features of the invention, there is provided an apparatus for practicing my novel process including an extruding device for delivering hot rod-like plastic in continuous form to a given area at which is disposed a substantially flat rotatable or indexable plate on which the delivered stock is laid as the plate rotates or is indexed whereby a desired configuration of plastic may be formed on the plate, such for example as a ring or the like.

Another feature of the invention relates to the provision of novel pressing equipment for flattening the plastic configuration formed on the rotating plate and for thus providing a sheet-like article having one or more highly polished side surfaces substantially free of air voids.

Other objects and features of this invention will more fully appear from the following detailed description taken in connection with the accompanying drawing which illustrates several embodiments thereof and in which Figure 1 is a diagrammatic plan view of an apparatus for practicing my novel process or method;

Figure 2 is a diagrammatic side view of the apparatus shown in Figure 1 and partly broken away;

Figure 3 is an end view of plates with a ring of plastic therebetween prior to the pressing of the plates together to squeeze the rod-like plastic into flat form;

Figure 4 is a plan view of the lower plate shown in Figure 2 with an extruded ring of plastic rod thereon;

Figure 5 is a diagrammatic fragmentary side view of platens of a press showing the structure of Figure 3 therebetween preparatory to the pressing operation;

Figure 6 is a plan view of the doughnut-like ring which is pressed from the extruded stock;

Figure 7 is a transverse cross-sectional view taken through the ring of Figure 6;

Figure 8 is a view similar to Figure 3 of a modification of the invention wherein the lower plate is provided with a rib-like groove;

Figure 9 is an enlarged fragmentary view of a portion of the structure shown in Figure 8, illustrating the structure on the lower platen of a press and showing how the stock flows after being flattened; and Figure 10 is a plan view of the doughnut ring with a reinforced rib-like outer edge made with the equipment shown diagrammatically in Figures 8 and 9.

As shown on the drawings:

At the outset, I desire to call attention to the fact that I believe that my novel process may be best understood from the description of an apparatus for practicing the same and which is illustrated more or less diagrammatically in the accompanying drawings. Also, it should be noted that the synthetic plastic material which I contemplate employing in the carrying out of my process may be of any conventional type, although I have attained excellent results by the use of synthetic plastics, such as cellulose acetate, ethyl cellulose and vinyl resins. The ingredients for such thermoplastics are well known in the art and hence will not be noted herein.

In the extrusion of such plastic materials, it has been the practice heretofore to heat them to a temperature of somewhere near the melting point, although this temperature can vary depending upon the particular ingredients of the plastic material being extruded. This information may be obtained from any recognized plastic handbook or specification manual.

The reference character 10 designates generally a plastic extruding machine, which may be of any conventional construction and includes the usual hopper 11 through which the plastic ingredients are supplied to the extruder. Also the extruder, as is well known in the art, may have suitable heating means for maintaining the plastic in a flowable state.

The extruding machine 10 has an extruding nozzle 12, which extrudes stock of any desired configuration, such for example, as a strip 13 of round, oval or polygonal cross-section. I have in the illustrated embodiment of my invention extruded hot rod-like stock having either a round or oval cross-section.

Also positioned adjacent the nozzle 12 of the extruder 10 is a knife or cut off device 14, which may be either manually or mechanically operated as desired. This knife may be of any suitable configuration, although it may be, for example, of the same type as is used in a molasses jar for cutting off the flow of molasses. The knife 14, however, should be of such arrangement that it may be intermittently operated either manually or otherwise to cut the extruded end 13 of the plastic when a desired amount has been extruded sufficient to complete the design being deposited on a thin flat polished sheet or disc 15. This disc 15 is disposed at an angle to the direction of the flow of the extruded plastic rod 13 so as to intercept and receive the same. While the illustrated angle is shown to be a right angle, it is, of course, clear that other angular arrangements could be employed.

The plate 15 is made of relatively thin sheet metal, such for example, as copper, silver or stainless steel, having a highly polished upper surface, and which can be made flexible to facilitate the stripping of it from the plastic. It is preferably heated before it is placed in a position to receive the plastic and the operator may handle it with the use of asbestos gloves or the like.

It will also be perceived that the plate 15 may be notched as at 16 to receive the lugs 17 on the radial or spoke-like arms 18 attached to the rotatable shaft 19 for rotating the plate 15. A motor 21 is provided for operating the shaft 19 through a suitable gearing or transmission housed in a box 20. This assembly for carrying the plate 15 is mounted on a suitable standard or base 22.

In the illustrated embodiment the rotation of the plate 15 may be intermittently controlled by turning off and on an electrical switch S. This may be done manually or by a suitable intermittent electrical motor switch.

In this illustrated embodiment, it is contemplated that a rotary motion will be given the plate 15 so that as the plastic rod 13 is deposited thereon, it will be formed into a circular shape or ring 25. After a sufficient amount of plastic has been delivered to complete the ring, the knife 14 is operated to cut off and automatically arrest the flow of the plastic so that the operator can quickly remove the plate 15 with the ring thereon and substitute another heated plate therefor ready to receive the oncoming cut end of the plastic rod flowing from the extruder. If it is so desired, the extruder can also be intermittently operated.

I find that from the standpoint of the formation of a flat doughnut article to be hereinafter described, it is immaterial whether the ends of the ring are exactly placed or whether they are slightly overlapped. The reason for this is that the subsequent pressing operation will take care of any such irregularity by redistributing the hot plastic.

It is also within the scope of the present invention to index the plate 15 by a Geneva gearing in the box 20, the use of which will enable different shapes of deposit, such for example as square or triangular shapes. One of the essential concepts, however, is the relative movement of the plate and the forwarding advancing extruded rod stock 13 so that the stock is caused to assume a desired shape or pattern on the plate.

At the same time as the operator removes the plate 15 and after the plastic ring 25 has been formed thereon, a second highly polished plate 26 is placed over the plastic, as shown in Figure 3. Then the two plates, 16 and 26, with the plastic ring 25 therebetween, are placed on a lower heated platen 28 of a press. The platen 28 may be heated by any suitable means such for example as steam, electricity, or the like, although in the form shown, I have illustrated a steam conduit 29 for supplying steam to the platen. There are many different types of press platens on the market that are suitable for this purpose.

At this time, it should be noted that the upper plate 26 is provided with a central opening 27 through which air may be discharged from the center of the plastic ring 25 when the upper platen 30 is brought into contact with the upper plate 26 in the squeezing of the plates together. The upper platen is provided with air passages 31 for communication with the hole 27 to enable a free escape of trapped air from the center of the plastic ring 25.

I also find that with my process, by reason of the use of hot plates 15 and 26 and hot plastic 25, it is not necessary to heat the upper platen 30. In other words, sufficient heat may be provided in the lower platen to enable a free flow of the plastic when subjected to pressure. The reason for this is that the upper platen 30 is only in engagement with the top plate 36 for a short interval of time so that it cannot have any substantial cooling effect on the same. In any event, my press operation, as distinguished from existing processes, eliminates any necessity for chilling in the press itself. This is distinctly advantageous in that it permits of a repeated rapid use of the press thereby enabling production on a rapid and economical scale of plastic rings.

It is also clear that after the plates 15 and 26 have been squeezed together to flatten the plastic ring 25 into the sheet-like doughnut 33, as shown in Figure 6, atmospheric pressure will tend to hold the plates in sealed engagement with the plastic so as to restrain the plastic from springing back until it has had time to take a set.

Upon removal of the plates 15 and 26 with the flattened plastic ring therebetween the same are substantially chilled as in water or in a refrigerated area and thereafter may be stripped from the plastic. By making at least one of the plates of flexible sheet metal, its stripping from the flattened plastic may be greatly facilitated. As soon as one plate has been removed from the chilled plastic, it is a relatively simple thing thereafter to strip the flattened ring 33 from the other plate.

The ring that is thus produced is a relatively thin sheet plastic ring, and has one or both of its sides highly polished, as desired. Subsequently, the ring may have its margins trimmed so as to form an article of exactly the desired size and shape. The ring that I thus produce lends itself particularly for use in the formation of automobile wheel trim rings and the like.

In Figures 8 to 10, I have illustrated a modification of the invention wherein the plastic ring 35 may be formed with a rib portion on one of its margins. This rib may be on either the inner or outer margin of the ring although it is desirable to form it only on one so as to permit the plastic to freely flow at one of its edges.

In this form of the invention, plates 36 and 37, similar to plates 15 and 26, are employed, the principal difference residing in one of the plates such as the plate 36 which is provided with a depression or groove 38. The plastic rod ring 35 is deposited on the plate 36 in the same manner as previously described. After the top plate 37 has been placed on the ring 35, the hot assembly is manually positioned on a lower platen 40. This platen 40 is similar to platen 28, but is provided with an annular depression 39 for receiving in nested relationship the depression 38 in plate 36.

When the plates are pressed together in the press, the plastic ring 35 is flattened into the form shown in Figures 9 and 10, and the plastic is caused to flow into the depression 38 thus forming a rib 42 on the margin of the plastic doughnut 41.

Subsequent to the chilling and stripping of the flattened ring 41 from the plate, the ring may be trimmed to the exact desired configuration.

Reference is made to my copending allowed application Serial No. 654,285, filed March 14, 1946, for coverage of the method involved in the instant modification of Figures 8 to 10, inclusive, having to do with the formation of a plastic sheet with a reinforcing rib.

I claim as my invention:

1. In a method of making a generally flat article from a thermoplastic material, the improvement comprising heating said material to render the same plastic, depositing the heated and plastic material on a hot polished plate, in direct contact therewith disposing a second hot polished plate directly onto the deposited material while it is still in the heated and plastic state, said two plates being formed so as to provide a mold for molding said material into the form of said article, and at least one of said plates being flexible, applying pressure to said two plates while said material still is plastic to mold said material into the form of said article and to force air from the interspace between said plates occupied by said material whereby said material will be sealed to said plates and after termination of said application of pressure will be maintained in the form of said article while still plastic, terminating said application of pressure while said material still is plastic, cooling said molded material and said plates as a sealed-together unit, flexing said flexible plate to remove the same from the resulting article and stripping the resulting article from the other plate.

2. In combination in plastic forming apparatus, an extruding device for extruding hot rod-like plastic in continuous strip form, a rotary support member under said extruding device, and a thin flat plate member supported by said rotary member and adapted to receive a strip of plastic extruded thereonto as it is rotated, the support provided by said supporting member leaving the plate at least partially marginally free on its underside so that it can be readily manually engaged, the periphery of the plate being notched, and the supporting member having interlock means engageable in said notched periphery to hold the supporting member and the plate for joint rotation.

3. In a method of making flat sheet-like ring-shaped disk blanks from thermoplastic material, the steps of heating a mass of the material to thermoplasticity, extruding a rod-shaped ring of the material in thermoplastic state upon a forming surface of larger diameter and free from obstructions either radially inwardly or radially outwardly of the ring of plastic material, placing a heated flattening plate upon the hot plastic ring, said plate also being free from obstructions either radially inwardly or radially outwardly of the ring and of substantially larger diameter than the ring, placing the plates with the ring of plastic material in heated condition between the plates into a press, and applying squeezing pressure to the plates to flatten the still hot and thermoplastic ring and flow the material thereof radially inwardly and radially outwardly freely to the limits of radially inward and radially outward flow of the material between said surfaces to spread out into a thin sheet between said plates.

4. In a method of making flat sheet-like ring-shaped blanks from thermoplastic material, which comprises placing upon a movable forming surface of unobstructed forming face area a ring of rod-like cross section of plastic material in heated thermoplastic condition, applying on top of said ring a heated forming plate, moving the assembly onto a heated bed, and applying pressure to the upper plate of the assembly by means of an unheated platen to squeeze the still hot thermoplastic material radially inwardly and radially outwardly between the lower forming member and the upper plate into a sheet ring of predetermined thickness, and while the assembly is still hot removing the same from between said bed and said platen, and then cooling the assembly to set the plastic before removal thereof from between said lower member and said top plate.

5. In a method of making a flat sheet-like ring-shaped disk blank of thermoplastic material, the steps of placing between a pair of movable forming members a ring-shaped mass of thermoplastic material, one of said forming members having an air escape opening registering in assembly with the central opening in the plastic ring, placing the assembly of forming members with the plastic ring therebetween into a press having opposed platens, applying pressure to said forming members by bringing said platens together onto the forming members and plastic assembly and squeezing the plastic into thin sheet-like ring-shaped layer between the forming members, and displacing the air from the center of the ring as it is flattened through the opening in said one forming member and beyond the opposing platen.

6. In a method of making a sheet-like ring-shaped blank of thermoplastic material, the steps of heating a mass of the material to render the same thermoplastic, extruding a closed ring of the thermoplastic material in rod-like cross section upon a hot polished forming surface of unobstructed forming face area and substantially greater area radially outwardly of the ring, placing a polished forming plate in heated condition and with a central air escape aperture onto the heated and plastic ring of material and with the aperture centered with respect to the central opening in the ring, applying pressure to said apertured plate by means of a platen and squeezing the heated thermoplastic material into thin sheet form by spreading the same radially inwardly and radially outwardly between said surfaces in response to the pressure, displacing the air through said aperture in the top plate as an incident to the squeezing pressure and dissipating the displaced air beyond said platen, separating said platen from said plate and cooling the assembly to set the plastic sheet-ring for removal from between the forming surfaces.

7. In a method of making thin sheet-like ring-shaped blanks of a thermoplastic material, the steps of placing a heated forming plate under a plastic material extruder with the nozzle of the extruder and the marginal portion of the plate relatively located to receive plastic material in heated thermoplastic condition on the top surface of the plate spaced inwardly from the margin thereof and also spaced radially outwardly from the center of the plate, extruding plastic material in rod-cross-sectional form from the nozzle onto the plate while rotating the plate until a complete ring of the rod-shaped plastic material in heated thermoplastic condition is deposited on the plate, removing the plate with the ring of plastic material in still thermoplastic heated condition from the association with the extruder, applying a second heated plate on top of the plastic ring and with a central aperture in the second plate registering with the center of the ring, placing the plates with the plastic ring assembled therebetween in a press having a heated lower platen, bringing an upper platen and said lower platen of the press together into squeezing relation to said plates and spreading the material of the plastic ring while still in its heated plastic condition radially inwardly and outwardly into ring-shaped sheet form, coincident with the squeezing of the ring displacing air from the center of the ring through said aperture and dissipating the air past said upper platen, promptly separating the platens after the pressing operation and removing the plate and plastic assembly from the press immediately upon separation of the platens, cooling the plate and plastic assembly, and stripping the formed plastic ring-sheet from between said plates after the plastic has set.

8. In combination in plastic forming apparatus, an extruding device for extruding hot rodlike plastic in continuous strip form in a downward direction, a rotary supporting device including a plurality of radial arms located under the extruding device and with the axis of rotation of said arms offset from the discharge outlet of the extruding device, and means on said arms for supporting a forming plate at spaced points of the latter in position to receive the extruded plastic thereon in ring form while the plate is rotated by the arms, the arms affording substantial spaces therebetween exposing the bottom of the plate for ready engagement of the plate to remove the same after the plastic has been deposited thereon.

9. In combination in apparatus for making thin sheet-like ring-shaped blanks of thermoplastic material, a pair of opposed forming surface members, at least one of which comprises a thin sheet metal plate having an aperture in the central position thereof and adapted to register with the central opening in a ring-shaped plastic mass interposed between the forming surfaces to be flattened therebetween into the sheet-like ring-shaped blank, and means for applying pressure to squeeze the plastic between said forming members including a platen engageable against said plate and having an air escape passage therethrough registering with said opening for the escape of air displaced from the center of the plastic ring through said aperture in the plate.

GEORGE ALBERT LYON.

(References on following page)

REFERENCES CITED

The following references are of record in the file of this patent:

UNITED STATES PATENTS

| Number | Name | Date |
|---|---|---|
| 362,597 | Bassett et al. | May 10, 1887 |
| 378,896 | Mooney | Mar. 6, 1888 |
| 1,196,974 | Pearson | Sept. 5, 1916 |
| 1,375,831 | Davis et al. | Apr. 26, 1921 |
| 1,427,831 | McCool | Sept. 5, 1922 |
| 1,719,290 | Danielson | July 2, 1929 |
| 1,918,127 | Pfeiffer | July 11, 1933 |
| 1,944,464 | Richardson | Jan. 23, 1934 |
| 1,969,323 | Person | Aug. 7, 1934 |
| 2,030,211 | Hulse | Feb. 11, 1936 |
| 2,070,023 | Olsen | Feb. 9, 1937 |
| 2,086,866 | Gwynn | July 13, 1937 |
| 2,103,860 | Mazzeo | Dec. 28, 1937 |
| 2,304,663 | Smith et al. | Dec. 8, 1942 |
| 2,310,619 | Dillehay | Feb. 9, 1943 |
| 2,329,867 | Whitehead | Sept. 21, 1943 |
| 2,372,114 | Perry et al. | Mar. 20, 1945 |